(12) United States Patent
Ohira et al.

(10) Patent No.: US 7,986,838 B2
(45) Date of Patent: Jul. 26, 2011

(54) IMAGE PROCESSING APPARATUS AND IMAGE PROCESSING METHOD

(75) Inventors: Masakazu Ohira, Nara (JP); Hideyoshi Yoshimura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 531 days.

(21) Appl. No.: 12/187,153

(22) Filed: Aug. 6, 2008

(65) Prior Publication Data

US 2009/0041360 A1    Feb. 12, 2009

(30) Foreign Application Priority Data

Aug. 7, 2007    (JP) ................................. 2007-205949

(51) Int. Cl.
*G06K 9/00* (2006.01)
*G01C 21/00* (2006.01)

(52) U.S. Cl. ........................................ 382/181; 701/201
(58) Field of Classification Search .................. 382/125, 382/159, 162, 165, 181, 190, 198, 201, 219, 382/220; 701/28, 201; 702/82; 704/209; 707/749

See application file for complete search history.

(56) References Cited

U.S. PATENT DOCUMENTS 5,465,353 A * 11/1995 Hull et al. ............................ 1/1
5,867,386 A * 2/1999 Hoffberg et al. ................ 700/83

FOREIGN PATENT DOCUMENTS

EP         1 914 680 A1    4/2008
WO    WO-2006/092957 A1    9/2006

* cited by examiner

*Primary Examiner* — Abolfazl Tabatabai
(74) *Attorney, Agent, or Firm* — Birch, Stewart, Kolasch & Birch, LLP

(57) ABSTRACT

The present invention provides an image processing apparatus capable of preventing deterioration of judgment accuracy when performing document matching process. To be more specific, when selecting feature points in the neighborhood of a target feature point, a predetermined number of feature points are selected after excluding a prespecified number of feature points in turn from the feature point nearest to the target feature point. For example, when the plurality of feature points are selected, the plurality of feature points, after excluding at least a feature point existing at a position nearest to the target feature point, are selected. Thereby, without increasing the amount of feature points for calculation of features (feature vectors), it is possible to prevent the deterioration of judgment accuracy.

6 Claims, 18 Drawing Sheets

| HASH VALUE | INDEX INDICATING DOCUMENT |
|---|---|
| H1 | ID1 |
| H2 | ID2 |
| H3 | ID1, ID2 |
| H4 | ID1 |
| H5 | ID1 |
| H6 | ID1, ID2 |

(b)

| HASH VALUE | INDEX INDICATING DOCUMENT |
|---|---|
| H1 | ID1, ID2 |
| H2 | ID1 |
| H3 | ID1, ID2 |
| H4 | ID1 |
| H6 | ID1, ID2 |

FIG. 14

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

IMAGE PROCESSING APPARATUS AND IMAGE PROCESSING METHOD

BACKGROUND OF THE INVENTION

1. Field of the Invention

The present invention relates to an image processing apparatus for judging similarity between inputted document image data and image data stored in advance.

2. Description of the Related Art

In this kind of image processing apparatus, there has been conventionally performed image processing for reading a document by a scanner and checking image data obtained by the reading against image data stored in advance to judge the similarity between the images.

For example, there are proposed a method of extracting a keyword from image data read by an OCR (optical character reader) and judging the similarity of the image on the basis of the extracted keyword, a method of limiting an image to be targeted by similarity judgment only to a record form image with ruled lines and extracting the characteristics of the ruled lines to judge the similarity of the image, a method of replacing character strings and the like in image data with points and determining the positional relationship among the points (feature points) as features to judge the similarity of the image, and the like.

International Publication WO2006/92957 (publication date: Sep. 8, 2006) discloses an image processing apparatus as described below. That is, connected parts of an image picked up by a digital camera or read by a scanner is regarded as word regions, and the centroids of the word regions are determined as feature points. The feature points are used to calculate a geometric invariant, and features are furthermore determined from this geometric invariant. The features, indexes indicating the feature points, and an index indicating the image are stored in a hash table.

In performing retrieval, feature points, features and indexes indicating the feature points for a retrieval query (inputted image) are determined in a similar process, and the hash table is accessed for performing voting for stored document images.

In determining the features described above, n feature points nearest to a certain target feature point are selected. Then, m (m<n) feature points are further selected from among the selected n feature points, and d (d=m or smaller) feature points are extracted from among the m feature points. For all combinations, the features related to the d feature points are calculated.

In the above retrieval method disclosed in International Publication WO2006/92957, however, when the centroid of a character is assumed to be a feature point, there may be a case where features calculated from patterns with almost no positional variations in centroids, such as long English words, agree with each other even if they are originally different character strings. Therefore, there is a problem that the accuracy of judgment of an image including a lot of such patterns deteriorates.

In view of the above situation, the object of the present invention is to provide an image processing apparatus and an image processing method capable of preventing deterioration of judgment accuracy when feature points are determined from a document image to calculate features (hash value) with the use of the feature points.

SUMMARY OF THE INVENTION

In order to achieve the above object, in the present invention, when feature points are determined from a document image to calculate features (feature vectors) (hash value) with the use of the feature points, a predetermined number of feature points are selected after excluding a prespecified number of feature points in turn from the feature point nearest to a target feature point to retrieve the similarity of the image without deterioration of the judgment accuracy.

That is, the present invention is an image processing apparatus which compares features extracted from inputted document image data with features of a reference image stored in advance to perform a judgment process on whether the inputted document image data is similar to the reference image stored in advance, wherein, when points indicating local characteristics of the image of the inputted document image data, which are determined from plurality of pixel values in the inputted document image data, are extracted and regarded as feature points, the features are values calculated on the basis of the positional relationship among plurality of feature points selected around a certain target feature point; and the image processing apparatus comprises a neighbor point selection section for, when selecting the plurality of feature points, selecting a predetermined number of feature points after excluding a prespecified number of feature points in turn from the feature point nearest to the target feature point.

According to the above configuration, it is possible to refer to a wider range of feature points without increasing the number of feature points used for calculation of features, and therefore, without increasing the amount of calculation and the amount of data. It is also possible, even in the case where the shapes formed by feature points extracted from different image data are locally similar to each other, to calculate the features as different values.

Accordingly, it is possible to prevent such a situation from occurring that, since the features of feature points determined from different character strings agree with each other, they are erroneously judged to agree with each other, and the accuracy of the final document image similarity judgment deteriorates.

For example, when the centroid of a character is regarded as a feature point, there may be a case where features calculated from patterns with almost no positional variations in centroids, such as long English words, agree with each other. The above characteristic is especially effective in the case of identifying an image including a lot of such patterns.

Here, the "inputted document image data" means the following two kinds of image data: (i) image data inputted by reading a document by a scanner and (ii) electronic data created by inputting necessary items in an electronic data format with the use of a computer (software). From the viewpoint of practical use, the following two kinds of data are conceivable: data obtained by reading data on paper by a scanner and electronizing the data, and data which is immediately created as electronic data.

The image forming apparatus of the present invention is characterized in being provided with the image processing apparatus according to any of the above descriptions and an image output section which forms an image according to inputted image data on a recording material.

According to the above configuration, it is possible to refer to a wider range of feature points without increasing the number of feature points used for calculation of features, and therefore, without increasing the amount of calculation and the amount of data, and it is possible to prevent such a situation from occurring that feature points extracted from different image data are judged to be such feature points that the shapes formed by the feature points are locally similar to each other, and the accuracy of the final document image similarity judgment deteriorates.

Accordingly, it in possible to prevent such a situation from occurring that, since the features of feature points determined from different character strings agree with each other, they are erroneously judged to agree with each other, and the accuracy of the final document image similarity judgment deteriorates.

The image processing method according to the present invention is an image processing method for comparing features extracted from inputted document image data and features of a reference image stored in advance to perform judgment on whether the inputted document image data is similar to the reference image stored in advance, wherein, when points indicating local characteristics of the image of the inputted document image data, which are determined from plurality of pixel values in the inputted document image data, are extracted and regarded as feature points, the features are values calculated on the basis of the positional relationship among plurality of feature points selected around a certain target feature point; and when the plurality of feature points are selected, the plurality of feature points, excluding at least a feature point existing at a position nearest to the target feature point, are selected.

According to the above configuration, it is possible to refer to a wider range of feature points without increasing the number of points used for calculation of features, and therefore, without increasing the amount of calculation and the amount of data, and it is possible, even in the case where the shapes formed by feature points extracted from different image data are locally similar to each other, to calculate the features as different values.

Furthermore, a program for causing the image processing apparatus according to the present invention to operate is provided with a program for causing a computer to function as each of the above means.

According to the above configuration, it is possible to prevent such a situation from occurring that features determined from different character strings happen to agree with each other and erroneously judged to agree with each other. Therefore, it is possible to realize a process with an improved matching accuracy by software.

Furthermore, as a recording medium according to the present invention, a computer-readable recording medium in which the above program is recorded can be also provided.

According to the above configuration, it is possible to control the operations of an image reading apparatus and an image forming apparatus, by the program read from the recording medium. Furthermore, with the use of a computer, it is possible to realize the above image processing method on the computer.

As described above, according to the present invention, by extracting feature points excluding a feature point near to a target feature point, and calculating a feature with the use of the feature points, it is possible to retrieve the similarity of an image without deterioration of the judgment accuracy.

BRIEF DESCRIPTION OF THE DRAWINGS

FIGS. 9(a) and 9(b) are diagrams showing a relationship between a hash value and an index indicating a document;

FIG. 14 is a diagram showing a hash table;

DETAILED DESCRIPTION OF THE PREFERRED EMBODIMENT

Figure 1:
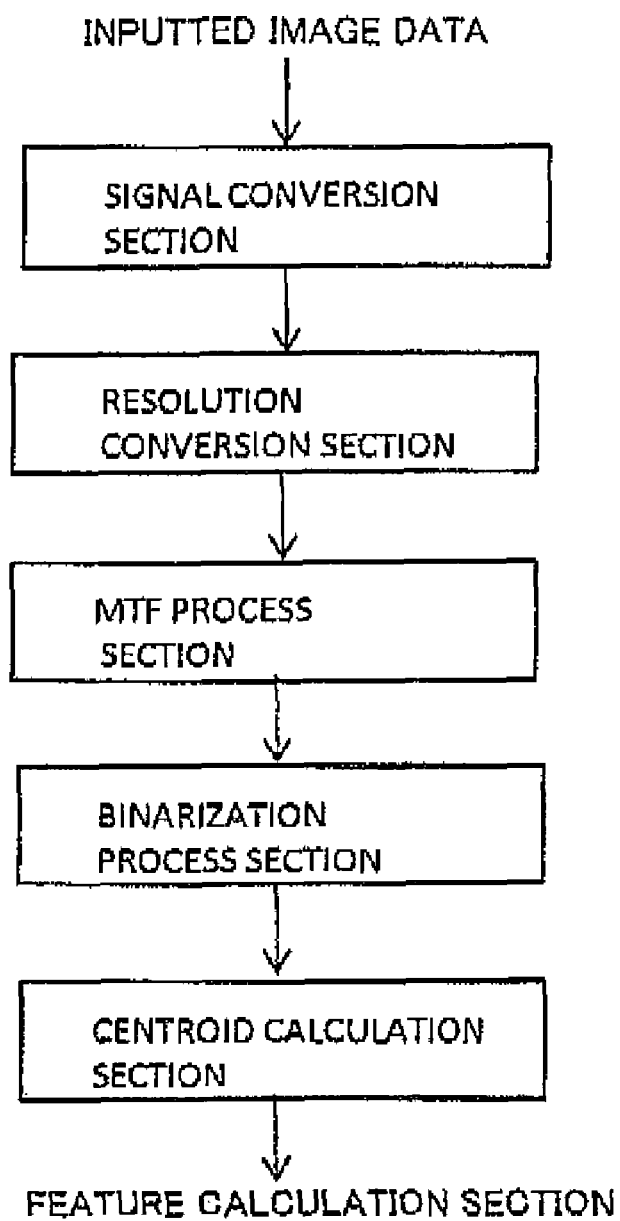
FIG. 1 is a configuration block diagram of a feature point calculation section of an image processing apparatus which is an embodiment of the present invention.
Figure 2:
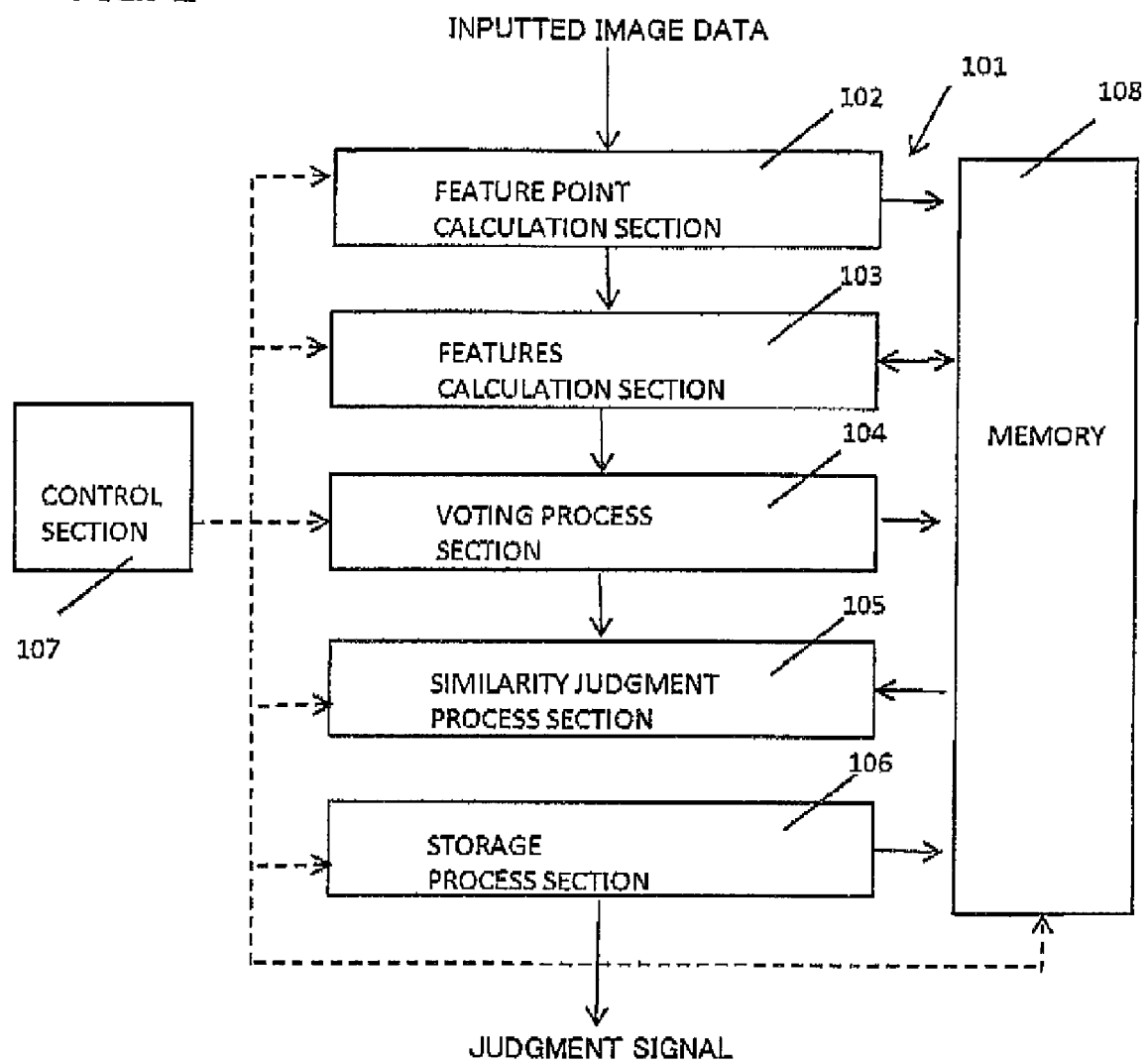
FIG. 2 is a configuration block diagram of a document matching process section of the image processing apparatus of the present invention.
Figure 3:
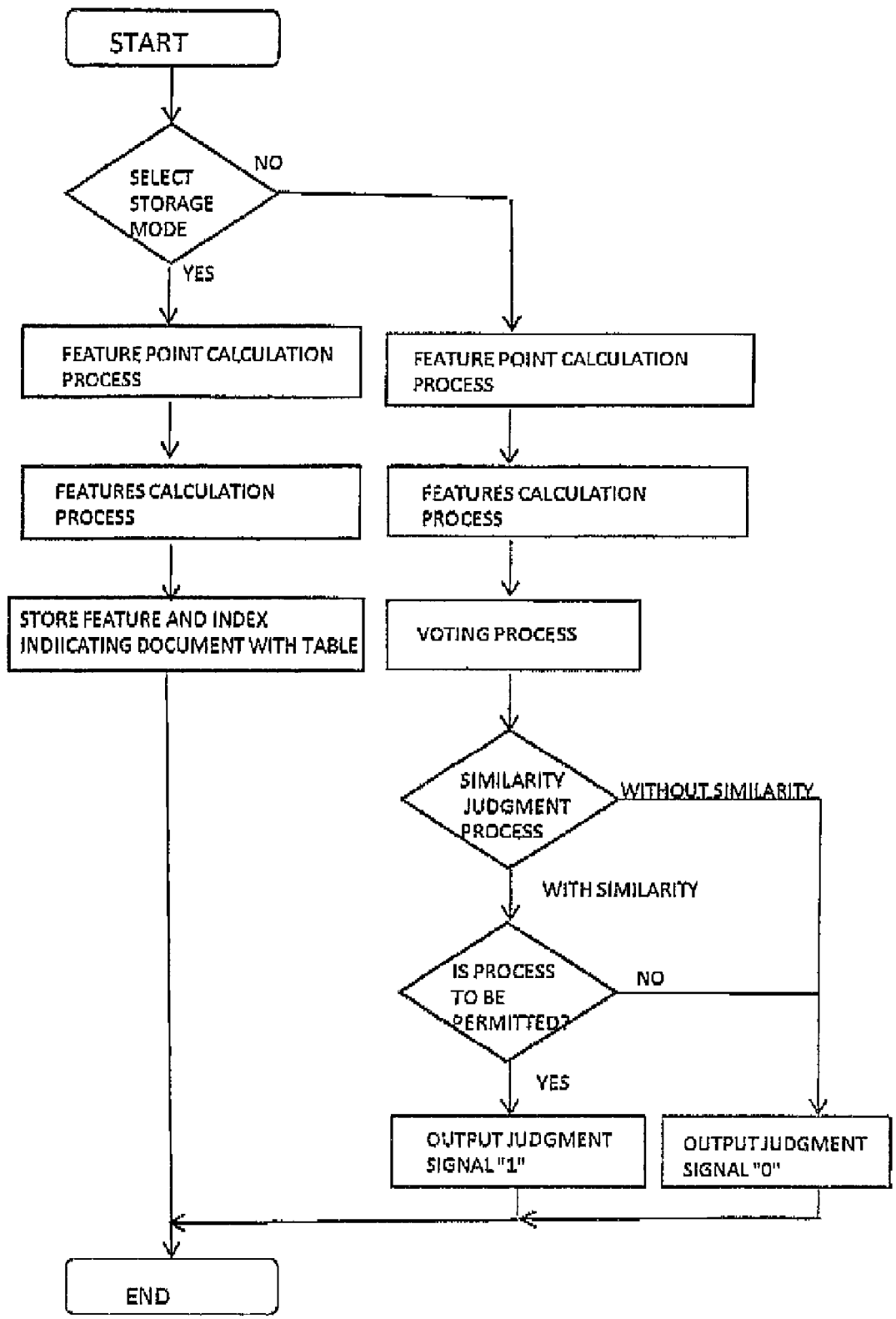
FIG. 3 is a flowchart of a document matching process of the present invention.

An embodiment of the present invention will be described below on the basis of drawings. FIG. 1 shows an example of the configuration of a feature point calculation section used in the present invention. FIG. 2 is a configuration block diagram of a document matching process section used in the present invention. FIG. 3 is a flowchart of a document matching process.

First, description will be made on the configuration of the document matching process section which is an essentially characteristic portion of the present invention. A document matching process section 101 is configured by a feature point calculation section 102, a feature calculation section 103, a voting process section 104, a similarity judgment process section 105, a storage process section 106, a control section 107 and a memory 108.

The feature point calculation section 102 extracts a connected component of a character string or a ruled line and calculates the centroid of the connected component as a feature point 110.

Figure 4:
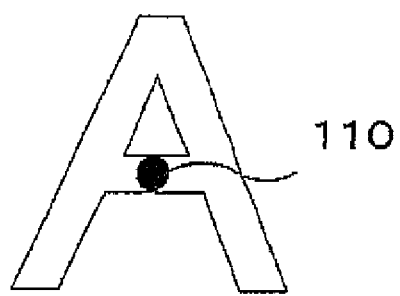
FIG. 4 is a diagram showing the centroid of a connected component of a character.
Figure 5:
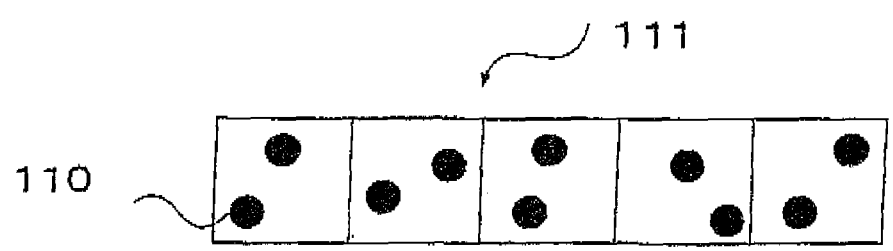
FIG. 5 is a diagram showing a result of extraction of feature points of the present invention.

FIG. 4 is a diagram showing the centroid 110 of a connected component of an English alphabet letter "A". FIG. 5 is a diagram showing a result of extraction of feature points of a character string 111.

The feature calculation section 103 calculates an invariant which is not changed by rotation, enlargement and reduction, that is, features which are parameters not changed by geometrical change, including rotation, translation and scaling, of a document image, with the use of the feature points 110 calculated by the feature point calculation section 102. Feature points in the neighborhood of a target feature point are selected and used to calculate the features.

In the present invention, when the feature points are selected, a prespecified number of the nearest neighbor feature points are excluded, and then the feature points are selected. The reason and an example of the calculation method will be described later.

The voting process section 104 casts a vote for a document stored in a hash table with the use of the features (feature vectors) (hash values) calculated from the document.

Figure 10:
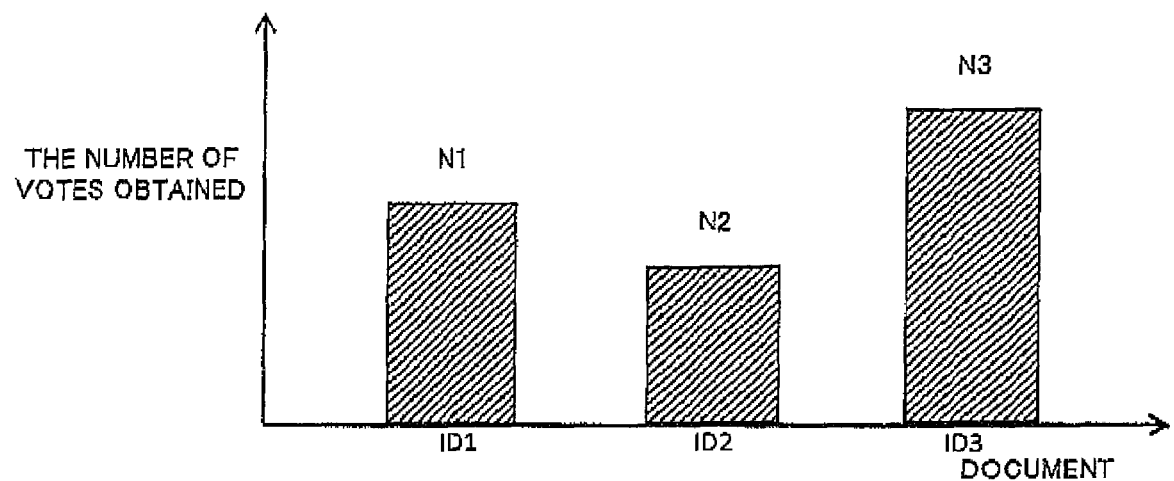
FIG. 10 is a diagram of relationship between a document and the number of votes obtained, for illustrating the processing method by a voting process section of the present invention.
Figure 11:
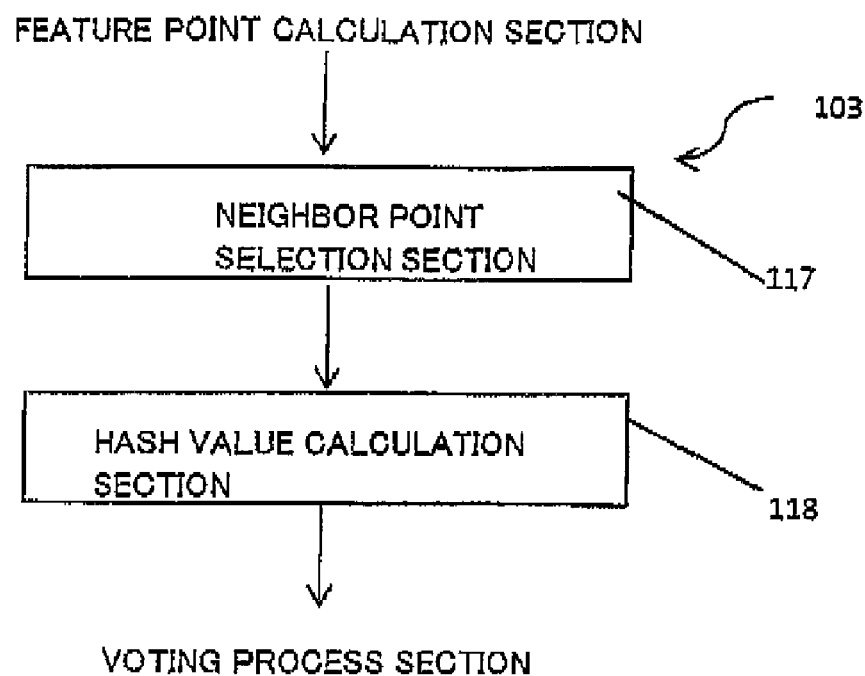
FIG. 11 is a configuration block diagram of a feature calculation section of the present invention.

FIG. 10 is a graph showing a relationship between a document and the number of votes obtained.

The similarity judgment process section 105 extracts a document (index) which has obtained the largest number of votes and the number of votes obtained, on the basis of a result of the voting process by the voting process section 104. Furthermore, the extracted number of votes obtained is compared with a predetermined threshold to calculate similarity. Alternatively, the extracted number of votes obtained is divided by the maximum number of votes obtained by the document for normalization, and the result is compared with a predetermined threshold. As an example of the threshold in this case, the threshold is set, for example, to 0.8 or above. If there is a handwriting portion, the number of votes obtained may be larger than the maximum number of votes obtained. Therefore, there is a possibility that the similarity is larger than 1.

The maximum number of votes obtained is indicated by the number of feature points×the number of hash values calculated from one feature point (target feature point).

Figure 6:
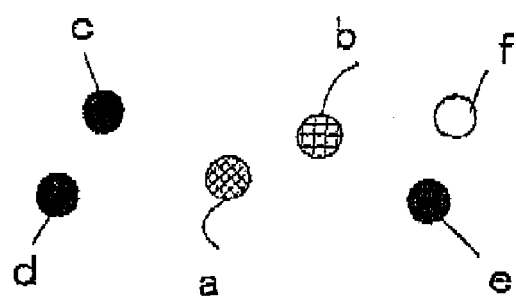
FIG. 6 is a diagram showing relationships among feature points and a target feature point.
Figure 7:
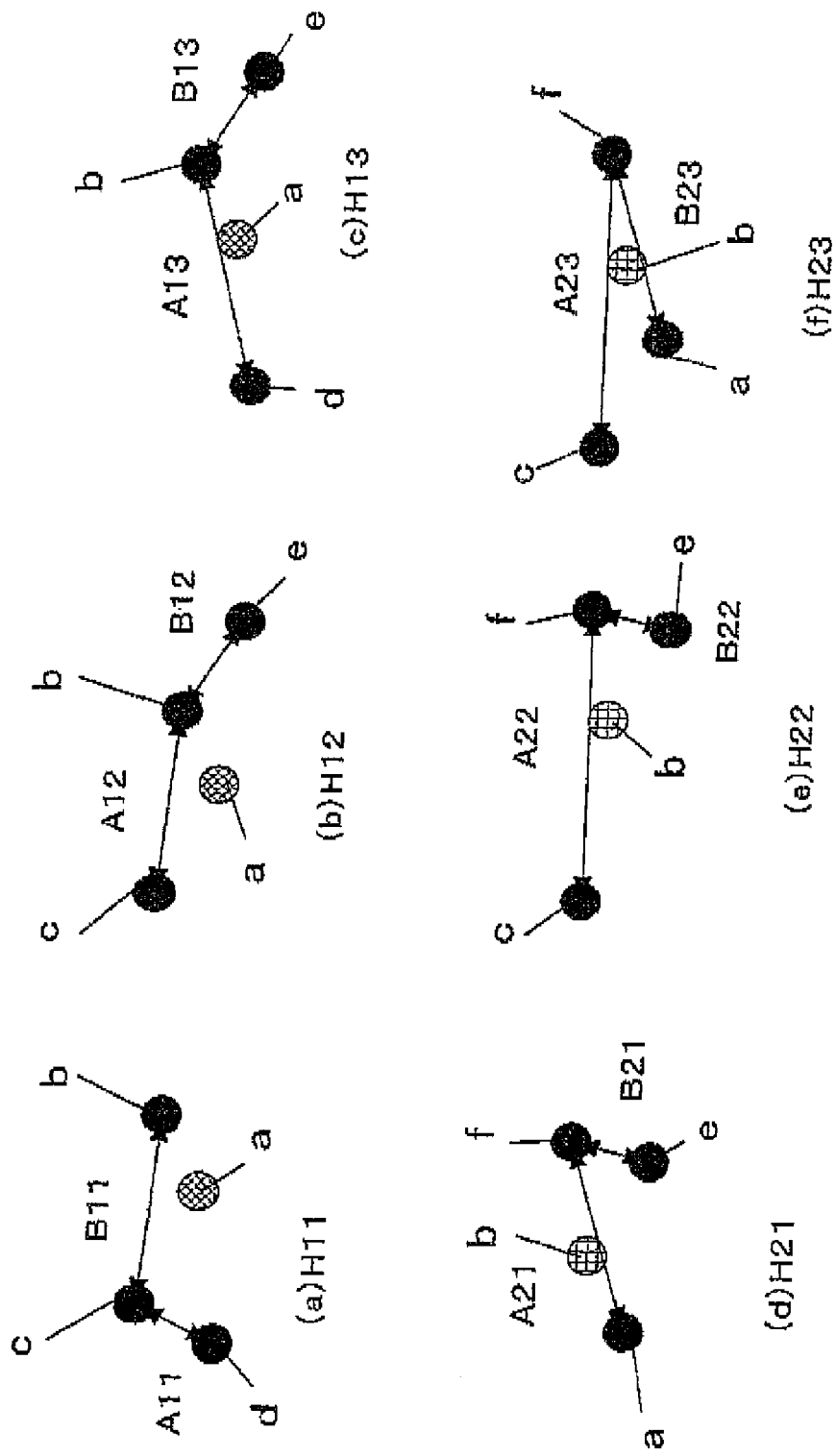
FIGS. 7(a) to 7(f) are diagrams showing an example in which one hash value is calculated from one feature point.
Figure 8:
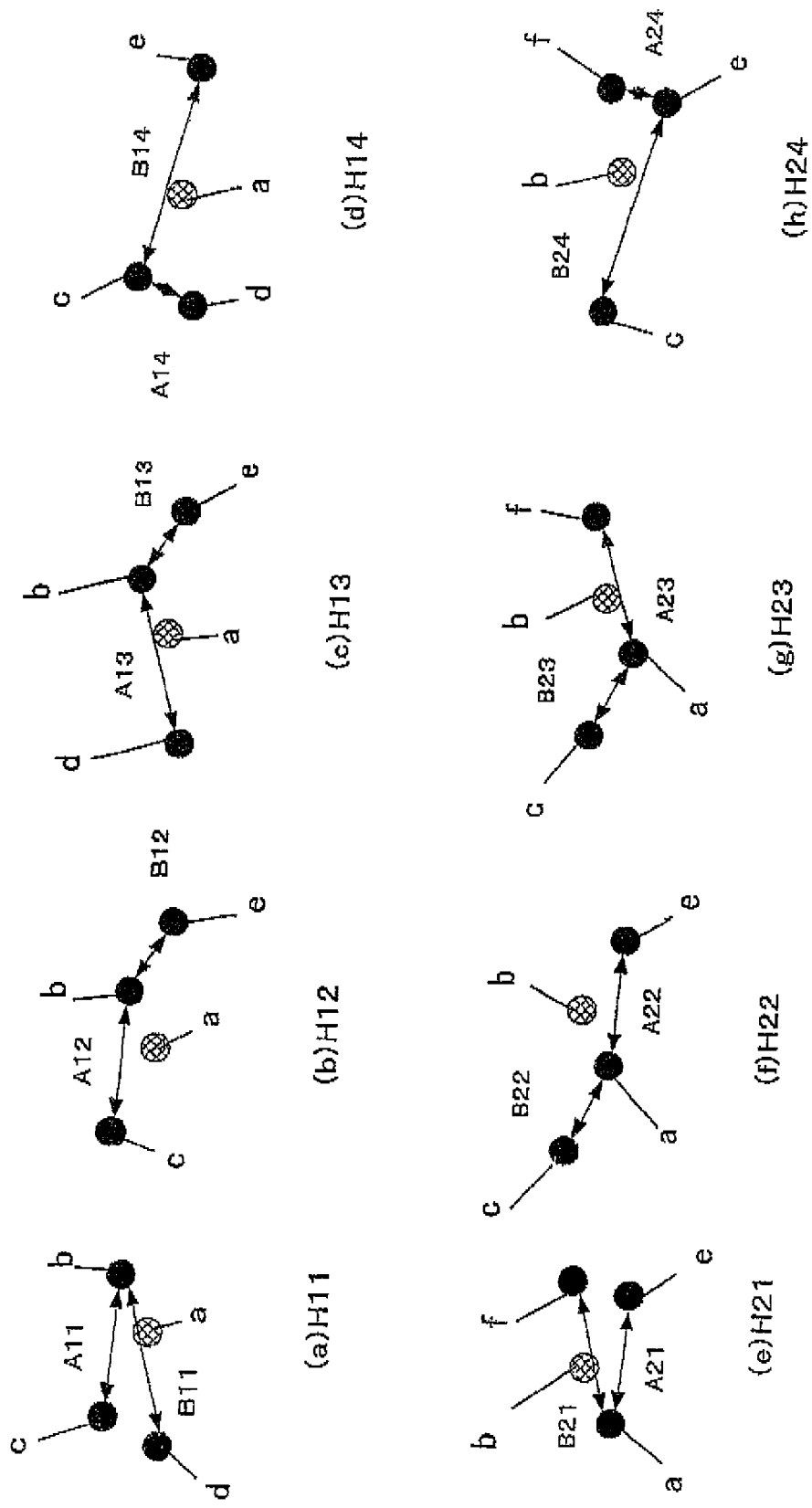
FIGS. 8(a) to 8(h) are diagrams showing another example in which one hash value is calculated from one feature point.

The examples in FIGS. 6 and 7 shows that one hash value is calculated from one feature point as the simplest example. However, by changing the method for selecting feature points around a target feature point, plurality of hash values can be calculated from one feature point. For example, the following method is conceivable. When six points are extracted as feature points around a target feature point, there are six combinations for extracting five points from the six points. For each of the six combinations, three points are extracted from five points to determine an invariant, and hash values are calculated.

The storage process section 106 stores an index (document ID) indicating the document according to the features (feature vectors) (hash values) calculated from the document. When a storage process is performed, the processes by the voting process section 104 and the similarity judgment process section 105 are skipped (not performed). On the contrary, in the case where the document matching process is performed, the process by the storage process section 106 is skipped.

The control section 107 is configured by the CPU of a microcomputer and controls access to the above process sections 102 to 106 and the memory 108.

Next, the configuration of the feature point calculation section 102 will be described on the basis of FIG. 1. The feature point calculation section 102 is configured by a signal conversion section 112, a resolution conversion section 113, an MTF correction process section 114, a binarization process section 115 and a centroid calculation section 116.

The signal conversion section 112 is a process section for, when inputted image data is a color image, achromatizing it and converting it to a Lightness or Luminance signal. For example, Luminance Y is determined from the following formula;

$$Y_j = 0.30R_j + 0.59G_j + 0.11B_j$$

$Y_j$: Luminance value of each pixel; $R_j$, $G_j$, $B_j$: color components of each pixel Instead of using the above method, an RGB signal may be converted to a CIE1976 L*a*b* signal (CIE: Commission International de l'Eclairage; L*: Lightness; a*: redness-greenness; b*: yellowness-blueness; Chrominance).

The resolution conversion section 113 performs a process for, when the magnification of the inputted image data has been optically changed by an image input apparatus, changing the magnification of the data again so that the resolution becomes a predetermined resolution. The resolution conversion section 113 is also used for resolution conversion for reducing the resolution to be lower than the resolution at the time of reading by an image input apparatus at the same magnification in order to reduce the amount of processing at the subsequent stage. For example, image data read with 600 dpi (dot per inch) is converted to 300 dpi data.

The MTF correction process section 114 performs a process for correcting the transfer characteristic (MTF: Modulation Transfer Function) of an optical pickup in an electronic circuit, and it is used to accommodate the problem that the spatial frequency characteristic of an image input apparatus differs according to the model.

As for an image signal outputted from a CCD, deterioration of the MTF (Modulation Transfer Function) is caused due to the opening degree of the aperture of optical parts, such as a lens and a mirror, and the receiving surface of the CCD, transmission efficiency, image lags, an integration effect and non-uniform operations of physical scanning, and the like Consequently, a read image is blurred due to the deterioration of the MTF.

The MTF correction process section performs a process for correcting the blurredness caused by deterioration of the MTF by performing a suitable filter process (enhancement process). The MTF correction process section is also used to suppress a high-frequency component which is not required for a subsequent-stage feature point extraction process. That is, enhancement and smoothing processes are performed with the use of a mixing filter (as for the filter coefficient, see FIG. 13).

By comparing the achromatized image data (a Luminance value (Luminance signal) or a Lightness value (Lightness signal)) with a threshold, the binarization process section 115 binarizes the image.

The centroid calculation section 116 performs labeling (a label attaching process) for each pixel on the basis of the binarized image data (for example, indicated by "1" and "0"), identifies a connected component where pixels attached with the same label are connected, extracts the centroid 110 of the identified connected component as a feature point, and outputs the extracted feature point 110 to the feature calculation section 103. The feature point 110 can be indicated by coordinate values (x and y coordinates) in the binarized image.

Next, the configuration of the feature calculation section 103 and an example of a feature calculation method will be shown. As shown in FIG. 10, the feature calculation section 103 is provided with a neighbor point selection section 117 which performs a process for selecting feature points around a target feature point from among plurality of feature points extracted by the feature point calculation section 102, and a hash value calculation section 118 which calculates hash values (features) from the selected neighbor points.

An example of the feature calculation method will be shown below.

i) The feature point calculation section 102 calculates the centroid (feature point) of a connected part of binarized image data. FIGS. 4 and 5 show an example in which a feature point of a character string is calculated.

ii) Feature points around a target feature point are selected (the neighbor point selection section 117). As shown in FIG. 6, if feature points around a target feature point a are denoted by b, c, d, e and f, the four feature points b, c, d and e around the target feature point a which are nearest to the target feature point a are selected.

iii) Three points are further selected from the selected four feature points (the neighbor point selection section 117), and three kinds (FIGS. 7(A) to 7(C); 7(D) to 7(F)) of invariant Hij are determined. For example, the remainder obtained from the following formula is regarded as a hash value Hi (features) (the hash value calculation section 118).

$$Hi = (Hi1 \times 10^2 + Hi2 \times 10^1 + Hi3 \times 10^0)/D$$

D: constant determined by setting the maximum value of hash value
i: natural number Alternatively, three points are further selected from the selected tour feature points, and four kinds (FIGS. 3(A) to 8(D); 8(E) to 8(H)) of invariant Hij are determined. For example, the hash value Hi (features) may be determined from the following formula.

$$Hi = (Hi1 \times 10^3 + Hi2 \times 10^2 + Hi3 \times 10^1 + Hi4 \times 10^0)/D$$

Here, as the formula for calculating the hash value, a well-known hash function other than the above may be used.

The invariant Hij is calculated, for example, from the following formula:

$$Hij = \frac{Aij}{Bij} Aij;$$

Bij: distance between feature points

The respective distances between feature points with respect to Aij and Bij are calculated from the coordinates of the feature points related to the distances. Thereby, the value Hij is an invariant which is not changed by similarity conversion.

iv) The hash value and an index (IDk) indicating the document are stored in a hash table (see FIG. 9). If hash values are the same value (H1=H5 in FIG. 9(B)), they may be integrated into one.

Next, a feature point selection method for calculating features will be described. In the case of selecting, for example, four feature points around a target feature point and further selecting three points from among the selected four feature points to determine three or four kinds of invariant, there may be a case where the same features are calculated for different character strings because positional variations in centroids are narrow and, therefore, the shapes formed by the feature points of the character strings are similar to each other.

Figure 16:
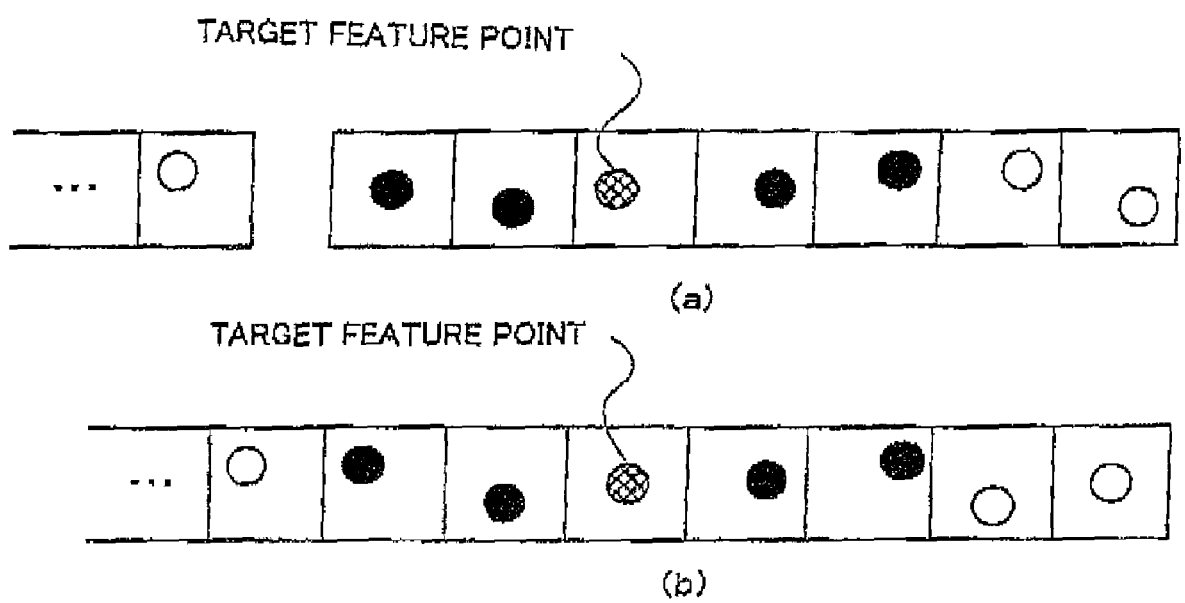
FIGS. 16(a) and 16(b) are diagrams showing examples of different character strings with little positional variations in centroids as simulation.

For example, FIG. 16 shows an example of narrow positional variations in centroids, and FIGS. 16(A) and 16(B) show different character strings as simulation. In FIG. 16, a circle indicates a feature point, and a filled circle indicates a feature point selected to calculate the features of a target feature point.

As shown in FIGS. 16(A) and 16(B), though the feature points in the two figures have been extracted from different character strings, they are judged to agree with each other. Thus, the judgment accuracy deteriorates. Especially, this is remarkable in an English sentence and the like.

Accordingly, in the present invention, when feature points around a target feature point are selected, a predetermined number of feature points are selected after excluding a prespecified number of feature points in turn from the feature point nearest to the target feature point.

By selecting feature points away from a target feature point, the possibility that feature points in the same shape are selected from different image patterns (character strings) can be reduced, and it is possible to reduce the probability that the features of different patterns erroneously agree with each other.

Figure 17:
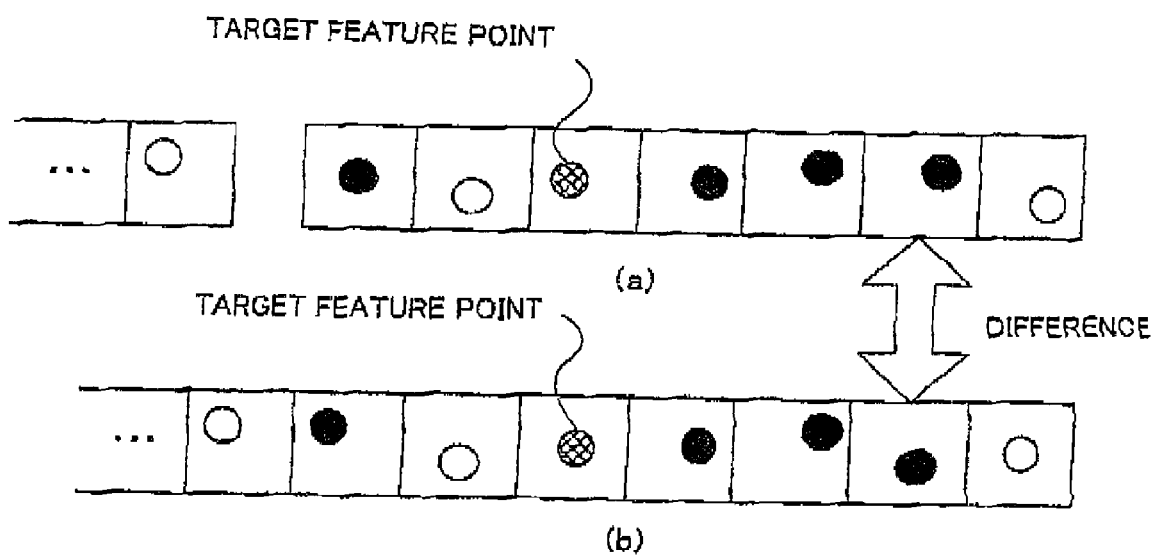
FIG. 17 is a diagram showing an example of selection of the feature points of the present invention from character strings corresponding to the character strings in FIG. 16.

FIG. 17 is a diagram showing a method of the present invention for selecting feature points corresponding to the character strings in FIGS. 16(a) and 16(b). The figure shows an example in which, "1" is set as a specified number of points when the feature points are selected, that is, the nearest neighbor feature point is excluded. The figure shows an example in which, though two character strings are different from each other, the shapes formed by four feature points which have been selected to calculate the features of a target feature point are similar to each other and, therefore, the features of the determined target feature points of the two character strings agree with each other.

In comparison, the example in FIGS. 17(a) and 17(b) shows that, since four points excluding the nearest neighbor feature point are selected, the points positioned one point farther than the points in FIG. 16 are referred to, and therefore, difference occurs between the shapes formed by the selected four points, and the feature points are different values.

Figure 18:
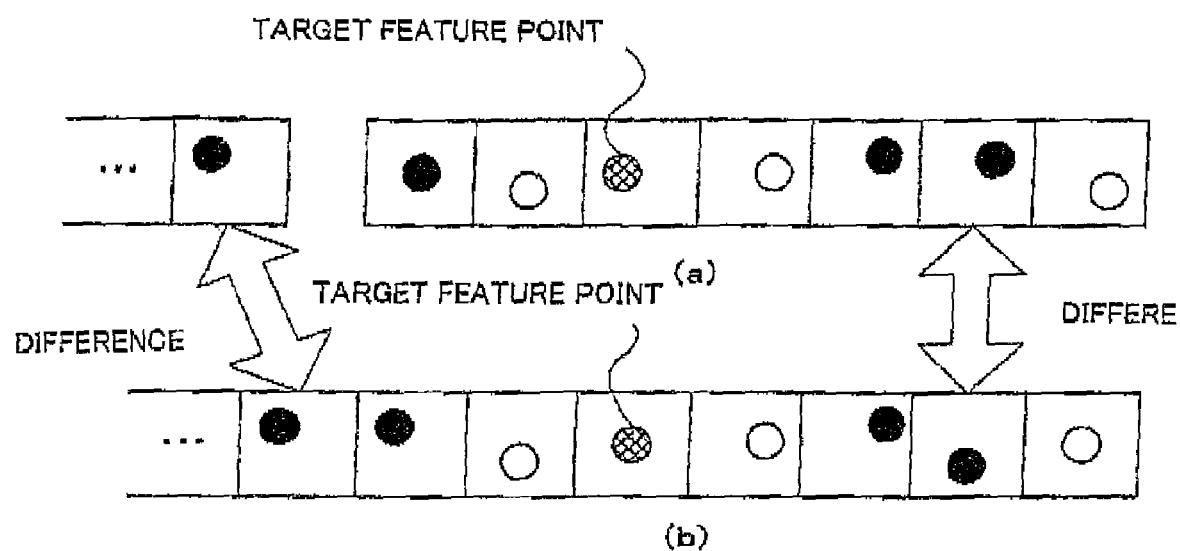
FIG. 18 is a diagram showing another example of selection of the feature points of the present invention from character strings corresponding to the character strings in FIG. 16.

FIGS. 18(a) and 18(b) show an example in which, as the specified number of points, the two nearest neighbor feature points as excluded. In this example, points positioned much farther than the points in FIG. 17 are used for calculation of the features of a target feature point. Therefore, the possibility that calculated features erroneously agree with each other is reduced more.

Next, the entire document matching process will be described on the basis of the flowchart in FIG. 3. First, it is determined whether a storage mode has been selected or not. If the storage is selected, a process for calculating feature points from inputted document image data is performed, and a process for calculating features from the calculated feature points is performed. Then, a process for storing the features and an index indicating the document with a table is performed, and the document matching process ends.

If the storage mode is not selected, the process for calculating feature points is performed first similarly to the case of the storage mode. Then, features are calculated from the calculated feature points and compared with the features of a stored reference image to judge whether the inputted document image data is similar to the reference image stored in advance. As a result of the judgment, if the data is similar to the reference image, it is determined whether a predetermined process is necessary or not. If it is necessary, a judgment signal "1" is outputted, and the process ends. If the process is not necessary, or the data is not similar to the reference image, a judgment signal "0" is outputted, and the process ends.

In the present invention, when feature points around a target feature point are selected in calculation of features in the document matching process, a predetermined number of feature points are selected after excluding a prespecified number of feature points in turn from the feature point nearest to the target feature point. If the specified number of points is, for example, "1", feature points excluding the feature point nearest to a target feature point, are selected. If the specified number of points is "2", a predetermined number of feature points, excluding the feature point nearest to a target feature point and the second neighbor feature point, are selected.

By calculating features by selecting feature points as described above, it is possible to retrieve the similarity of an image without deterioration of the judgment accuracy.

Figure 12:
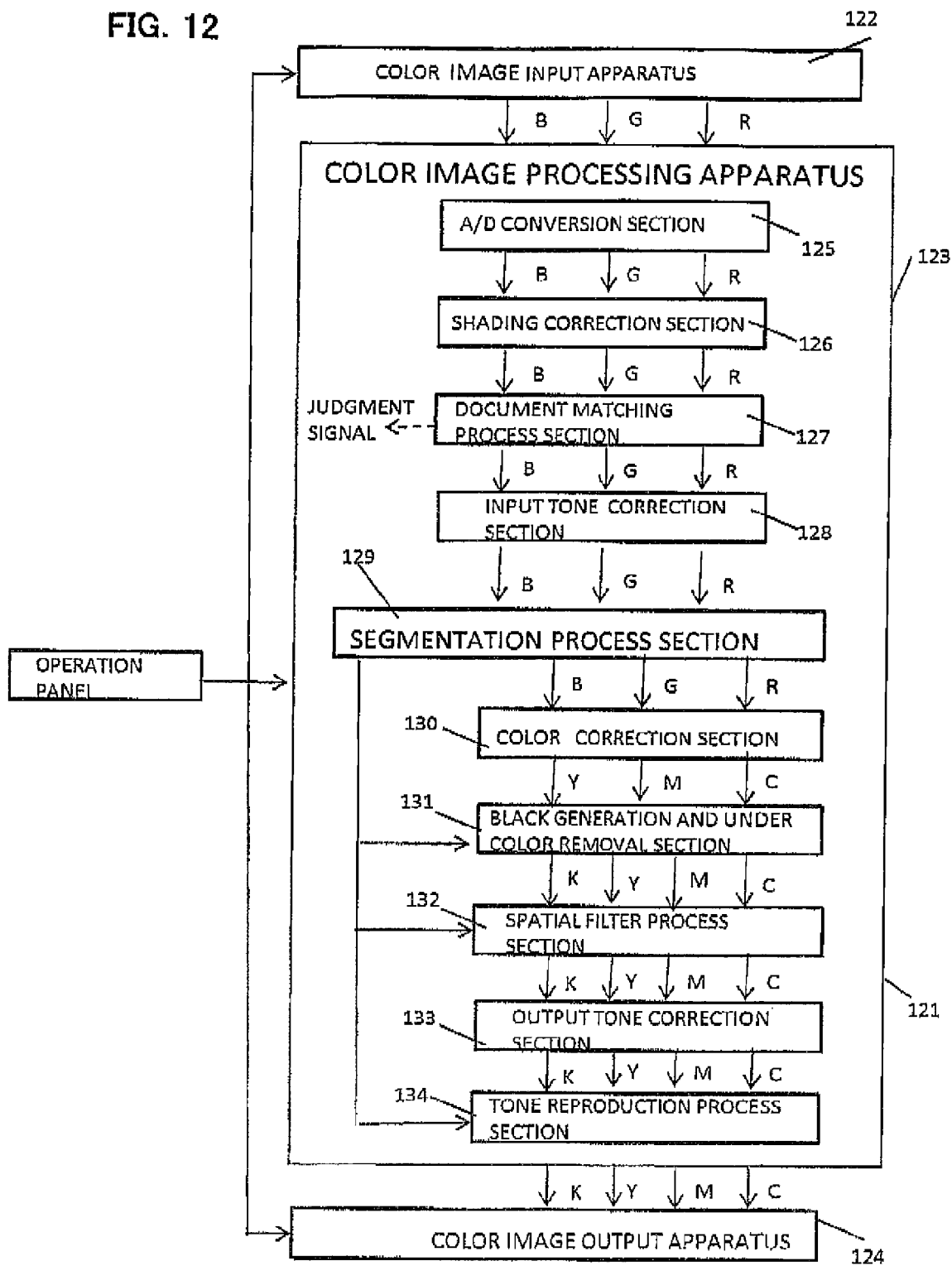
FIG. 12 is a configuration block diagram of a digital color copying machine to which the present invention is applied.

FIG. 12 is a configuration block diagram of a digital color copying machine as an image processing apparatus to which the present invention is applied. A digital color copying machine 121 is configured by a color image input apparatus 122, a color image processing apparatus 123 and a color image output apparatus 124.

The color image input apparatus 122 is configured, for example, by a scanner section provided with a device, for example a CCD, for converting optical information to an electrical signal, and it outputs a reflected light image from a document as an RGB analog signal.

The analog signal read by the color image input apparatus 122 is sent through an A/D conversion section 125, a shading correction section 126, a document matching process section 127, an input tone correction section 128, a segmentation process section 129, a color correction section 130, a black generation and under color removal section 131, a spatial filter process section 132, an output tone correction section 133 and a tone reproduction process section 134 in that order within the color image processing apparatus 123, and it is outputted to a color image output apparatus 124 as C (cyan), M (magenta), Y (yellow) and K (black) signals.

The A/D conversion section 125 converts an RGB (R: red; G: green; B: blue) analog signal to a digital signal. The shading correction section 126 performs a process for removing various distortions caused in the illumination system, image focusing system and image sensing system of the color image input apparatus 122 for the digital RGB signal sent from the A/D conversion section 125. Furthermore, the shading correction section 126 adjusts color balance, and performs a process for conversion into a signal which can be easily processed by the color image processing apparatus 123, such as a density (pixel value) signal.

The document matching process section 127 performs a feature point calculation process, and judges similarity between an inputted image data and reference document image data stored in advance with the use of the result of the feature point calculation process. If it is judged that there is similarity, processes such as copying, electronic distribution, facsimile transmission and filing are prohibited as shown in FIG. 3. The document matching process section 127 outputs the inputted RGB signal to the input tone correction section 128 without any modification.

The input tone correction section 128 performs an image quality adjustment process such as removal of page background density and contrast adjustment, for the RGB signal from which various distortions have been removed by the shading correction section 126.

The segmentation process section 129 segments each pixel in inputted image data into any of a text area, a halftone dot area and a photograph (continuous tone) area, on the basis of the RGB signal. The segmentation process section 129 outputs, on the basis of the result of the segmentation, a segmentation class signal indicating which area a pixel belongs to, to the black generation and under color removal section 131, the spatial filter process section 132 and the tone reproduction process section 134, and outputs an input signal outputted from the input tone correction section 128 to the subsequent-stage color correction section 130 as it is.

The color correction section 130 performs a process for removing color impurity based on the spectroscopic characteristic of CMY color material including a useless absorption component in order to realize faithful color reproduction.

The black generation and under color removal section 131 performs a process for black generation for generating a black (K) signal from a CMY three-color signal after the color correction, and for generating a new CMY signal by subtracting the K signal obtained by the black generation from the original CMY signal. Thereby, the CMY three-color signal is converted to a CMYK four-color signal.

The spatial filter process section 132 performs a spatial filter process by a digital filter for the image data of the CMYK signal inputted from the black generation and under color removal section 131, on the basis of the segmentation class signal, and corrects the spatial frequency characteristic. Thereby, it is possible to reduce blurredness and graininess deterioration of an output image.

Similarly to the spatial filter process section 132, the tone reproduction process section 134 performs a predetermined process to be described later, for the image data of the CMYK signal on the basis of the segmentation class signal.

For example, for an area segmented as a text by the segmentation process section 129, the spatial filter process section 132 performs edge enhancement processing so as to emphasize high-frequency components in order to improve the reproducibility of texts. And the tone reproduction process section 134 performs a binarization or multi-level dithering process using a high-resolution screen suitable for reproduction of a high-frequency component.

As for an area segmented as halftone dots by the segmentation process section 129, the spatial filter process section 132 performs a low-pass filter process for removing an input halftone dot component.

Then, the output tone correction section 133 performs an output tone correction process for converting a signal such as a density signal to a halftone screen area ratio, which is a characteristic value of the color image output apparatus 124. After that, the tone reproduction process section 134 performs a tone reproduction process so that, finally, separating the image into pixels and each tone of the pixels can be reproduced. As for an area segmented as a photograph by the segmentation process section 129, a binarization or multi-level dithering process is performed with the use of a screen suitable for tone reproduction.

The image data for which each of the processes described above has been performed is stored in the storage device once, and, at a predetermined timing, it is read and inputted into the color image output apparatus.

The color image output apparatus 124 outputs image data on a recording medium such as paper. For example, a color image output apparatus using an electrophotography system or an inkjet system can be given. However, the color image output apparatus 124 is not limited thereto. The processes described above are controlled by a CPU (Central Processing Unit) not shown.

The present invention may be applied not to a digital copying machine but to a digital color multi-function peripheral 141 (see FIG. 15) which is provided with a copying function, a printer function, a facsimile transmission function, a scan to e-mail function and the like.

Figure 15:
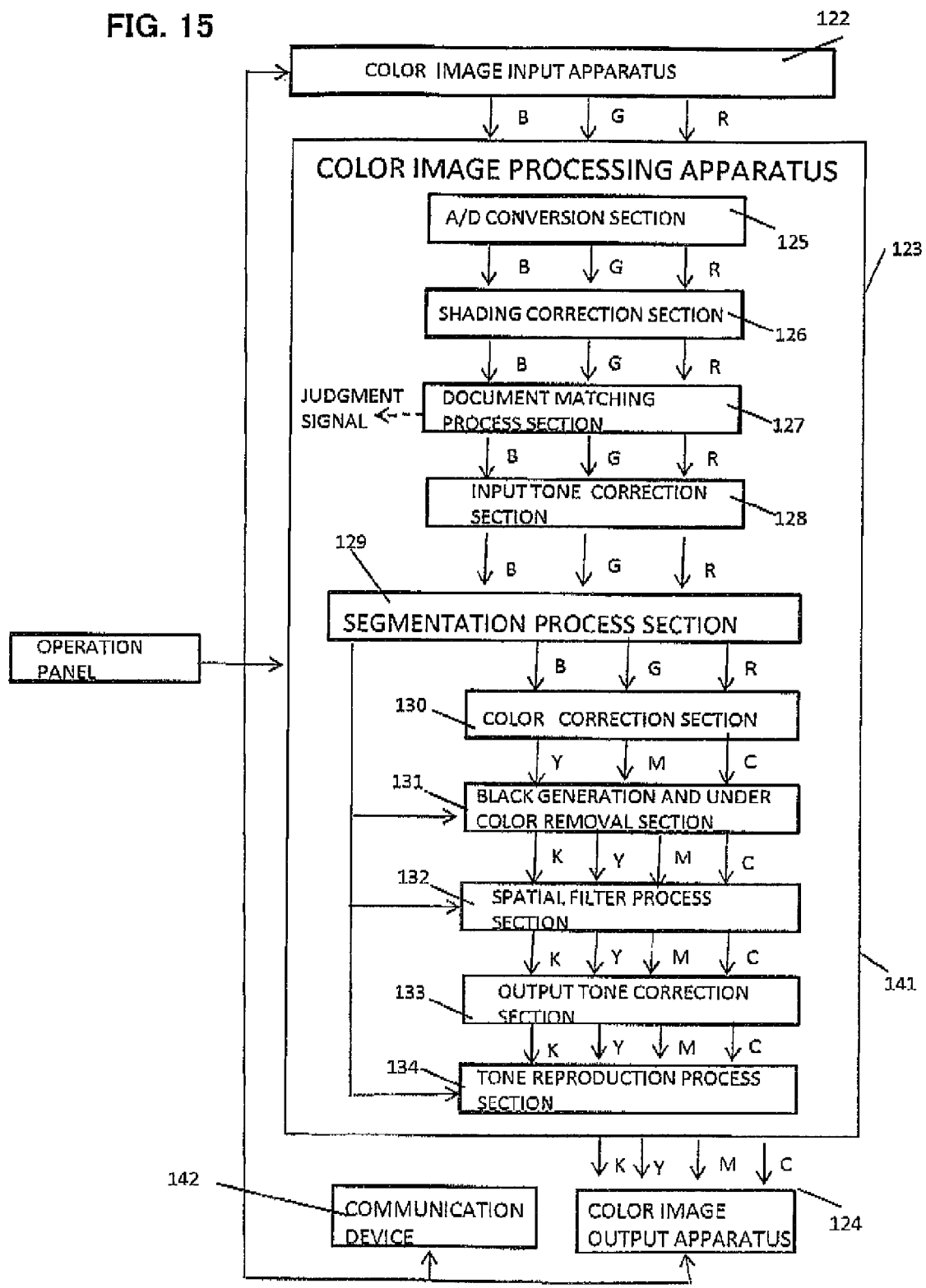
FIG. 15 is a configuration block diagram of a digital color multi-function peripheral to which the present invention is applied.

As shown in FIG. 15, the digital color multi-function peripheral 141 is further provided with a communication device 142 configured, for example, by a modem or a network card. In the case of performing facsimile transmission, when a transmission procedure with a destination is performed via the modem and a transmittable state is secured, image data (image data read by a scanner) which has been compressed in a predetermined format is read from a memory. Then, a process such as conversion of the compression format are performed, and the image data is sequentially transmitted to the destination via a communication line.

In the case of receiving image data by facsimile, the CPU receives the image data transmitted from an originating communication device and inputs it into the color image processing apparatus 123 while performing a communication procedure. In the color image processing apparatus 123, a compression/decompression process section (not shown) performs a compression/decompression process for the received image data. A rotation process and a resolution conversion process are performed for the decompressed image data as necessary. Then, output tone correction and tone reproduction processes are performed, and the image data is outputted from the color image output apparatus 124.

It is also possible to perform data communication with a computer or another digital multi-function peripheral connected to the network via a network card or a LAN cable.

Though the color multi-function peripheral 141 has been described above, a monochrome multi-function peripheral is also possible. Furthermore, a single facsimile communication apparatus is also possible.

Figure 13:
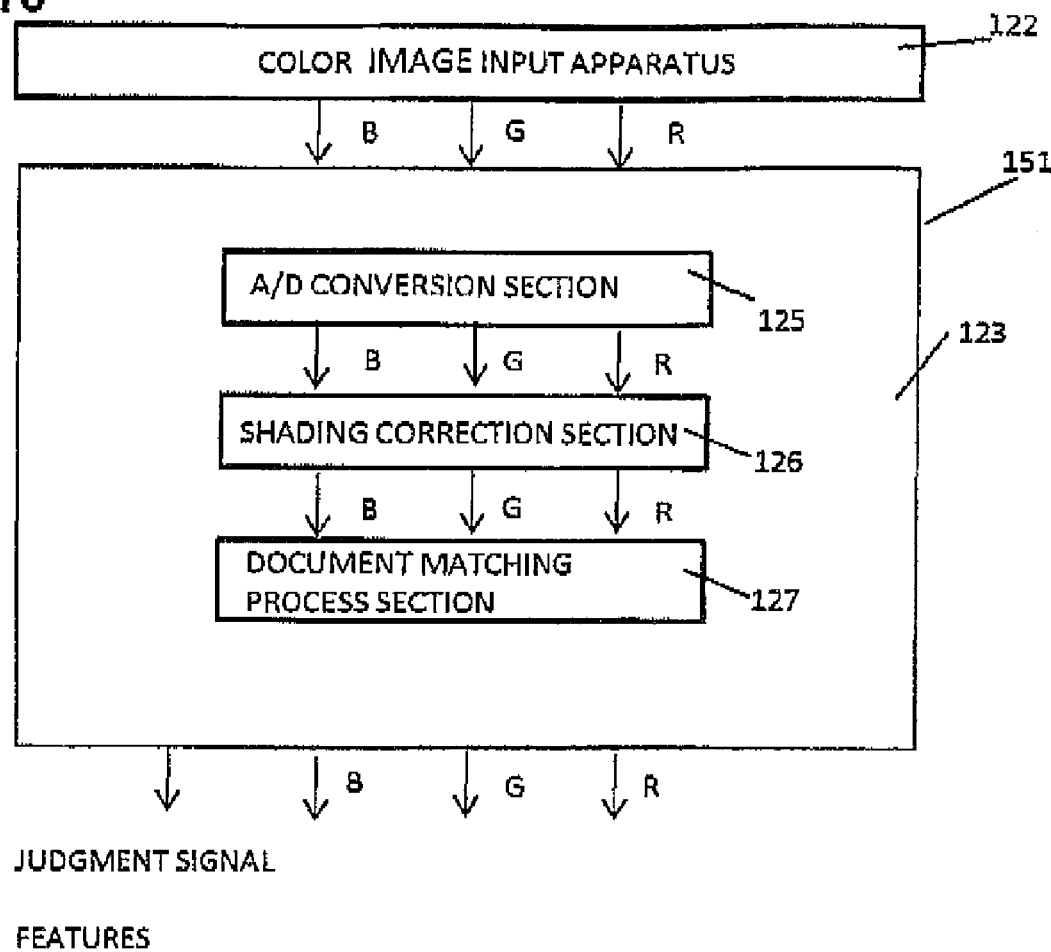
FIG. 13 is a configuration block diagram of an image reading apparatus to which the present invention is applied.

FIG. 13 is a block diagram showing the configuration of an image reading apparatus (flat bed scanner) which is provided with the document matching process section constituting the essentially characteristic portion of the present invention. As shown in the figure, a color image processing apparatus 123 is configured by an A/D conversion section 125, a shading correction section 126 and a document matching process section 127. By further connecting a color image input apparatus 122 to the color image processing apparatus 123, an image reading apparatus 151 as a whole is configured.

The color image input apparatus (image reading section) 122 is configured, for example, by a scanner section provided with a CCD (Charge Coupled Device), and it reads a reflected light image from a document as an RGB (R: red; G: green; B: blue) analog signal by the CCD and inputs it into the color image processing apparatus.

The analog signal read by the color image input apparatus 122 is sent through the A/D conversion section 125, the shading correction section 126 and the document matching process section 127 in that order within the color image processing apparatus 123.

The A/D (analog/digital) conversion section 125 converts an RGB analog signal to a digital signal. The shading correction section 126 performs a process for removing various distortions caused in the illumination system, image focusing system and image sensing system of the color image input apparatus 122 for the digital RGB signal sent from the A/D conversion section 125. The shading correction section 126 adjusts color balance. The shading correction section 126 also converts an RGB reflectance signal to a density signal.

The document matching process section 127 performs a feature point calculation process, and judges similarity between an inputted image data and reference document image data stored in advance with the use of the result of the feature point calculation process. If it is judged that there is similarity, a judgment signal which prohibits processes such as copying, electronic distribution, facsimile transmission and filing is outputted.

The judgment signal is transmitted to a printer or a multi-function peripheral together with read image data via a network, or it is inputted to a printer via a computer or directly to a printer. In this case, it is necessary that the printer, the multi-function peripheral or the computer can judge a signal indicating the contents of the process. It is also possible to output features calculated by the document matching process section 127 instead of the judgment signal.

A digital camera may be used as the image reading apparatus of this embodiment.

Furthermore, according to the present invention, an image processing method for performing the document matching and output control described above can be recorded in a computer-readable recording medium in which program codes of programs (an executable program, an intermediate code program and a source program) to be executed by a computer are recorded.

Consequently, it is possible to portably provide a recording medium in which program codes for implementing an image processing method for performing document matching, output control and document image storage processes are recorded.

As for the recording medium in this embodiment, since the processes are performed by a microcomputer, a memory not shown, such as a ROM, itself may be a program medium. Such a program medium is also possible as can be read by inserting a recording medium into a program reading medium as an external storage apparatus though it is not shown.

In any case, the stored program may be configured so as to be accessed and executed by a microprocessor. Alternatively, in any case, it is possible that a program code is read, and the read program code is downloaded to a program storage area (not shown) of a microcomputer and executed. The program to be downloaded is assumed to be stored in the body apparatus in advance.

The above program medium is a recording medium configured in a manner that it can be separated from the body, and it may be a tape system, such as a magnetic tape and a cassette tape, a disk system such as a magnetic disk including a floppy disk and a hard disk, and an optical disk including a CD-ROM, an MO, an MD, and a DVD, a card system such as an IC card (including a memory card) and an optical card, or a medium for holding the program fixed therein, including a semiconductor memory such as a mask ROM, an EPROM (Erasable Programmable Read Only Memory), an EEPROM (Electrically Erasable Programmable Read Only Memory) and a flash ROM.

In this embodiment, since the system configuration is such that a communication network including the Internet can be connected, the medium may be such that fluidly holds the program so that the program code can be downloaded from the communication network.

In the case of downloading the program code from the communication network as described above, the program to be downloaded may be stored in the body apparatus in advance or may be installed from a different recording medium.

The present invention can be also realized in a form of a computer data signal embedded in a carrier wave in which the program code is embodied by electronic transmission.

The image processing method described above is executed by the recording medium being read by a program reading apparatus provided for a digital color image forming apparatus or a computer system.

The computer system is configured by an image input apparatus such as a flat bed scanner, a film scanner and a digital camera, a computer on which various processes such as the above image processing method are performed by a predetermined program being loaded thereto, an image display apparatus, such as a CRT display and a liquid crystal display, for displaying the result of the processes by the computer, and a printer for outputting the result of the processes by the computer on paper or the like. Furthermore, there is provided a network card or a modem as communication means for connecting to a server and the like via a network.

As described above, according to the present invention, by extracting feature points, excluding a prespecified number of feature points near to a target feature point, and calculating features with the use of the feature points, it is possible to retrieve the similarity of an image without deterioration of the judgment accuracy.

What is claimed is:

1. An image processing apparatus which compares features extracted from inputted document image data with features of a reference image stored in advance to perform a judgment process on whether the inputted document image data is similar to the reference image stored in advance, wherein
when points indicating local characteristics of the image of the inputted document image data, which are determined from plurality of pixel values in the inputted document image data, are extracted and regarded as feature points, the features are values calculated on the basis of the positional relationship among plurality of feature points selected around a certain target feature point; and
the image processing apparatus comprises a neighbor point selection section for, when selecting the plurality of feature points, selecting a predetermined number of feature points after excluding a prespecified number of feature points in turn from the feature point nearest to the target feature point.

2. The image processing apparatus according to claim 1, wherein, when selecting the plurality of feature points, the neighbor point selection section selects the plurality of feature points, excluding at least a feature point existing at a position nearest to the target feature point.

3. The image processing apparatus according to claim 1, wherein, when selecting the multiple feature points, the neighbor point selection section selects the multiple feature points, excluding at least a feature point existing at a position nearest neighbor to the target feature point and a feature point existing at the second neighbor position.

4. An image forming apparatus comprising:
the image processing apparatus according to claim 1; and
an image output section which forms an image according to inputted image data on a recording material.

5. A computer-readable recording medium in which a program for causing the image processing apparatus according to claim 1 to operate is recorded, the program being for causing a computer to function as the neighbor point selection section.

6. An image processing method for comparing features extracted from inputted document image data with features of a reference image stored in advance to perform judgment on whether the inputted document image data is similar to the reference image stored in advance, wherein
when points indicating local characteristics of the image of the inputted document image data, which are determined from plurality of pixel values in the inputted document image data, are extracted and regarded as feature points, the features are values calculated on basis of the positional relationship among plurality of feature points selected around a certain target feature point; and
when the plurality of feature points are selected, a predetermined number of feature points are selected after excluding a prespecified number of feature points in turn from the feature point nearest to the target feature point.

* * * * *